United States Patent
Liu et al.

(10) Patent No.: US 9,215,277 B2
(45) Date of Patent: Dec. 15, 2015

(54) RESOURCE SHARING METHOD AND DEVICE, AND STORAGE MEDIUM

(71) Applicant: TENCENT TECHNOLOGY (SHENZHEN) COMPANY LIMITED, Guangdong (CN)

(72) Inventors: Gang Liu, Guangdong (CN); Hang Yin, Guangdong (CN); Xiaokang Li, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 93 days.

(21) Appl. No.: 14/127,382

(22) PCT Filed: Dec. 7, 2012

(86) PCT No.: PCT/CN2012/086150
§ 371 (c)(1),
(2) Date: Dec. 18, 2013

(87) PCT Pub. No.: WO2013/131387
PCT Pub. Date: Sep. 12, 2013

(65) Prior Publication Data
US 2014/0122608 A1  May 1, 2014

(30) Foreign Application Priority Data

Mar. 5, 2012 (CN) .......................... 2012 1 0055783

(51) Int. Cl.
*G06F 15/16* (2006.01)
*H04L 29/08* (2006.01)
*H04L 29/06* (2006.01)

(52) U.S. Cl.
CPC .......... *H04L 67/104* (2013.01); *H04L 67/1076* (2013.01); *H04L 63/08* (2013.01); *H04L 63/10* (2013.01); *H04L 67/1091* (2013.01); *H04L 2463/103* (2013.01)

(58) Field of Classification Search
CPC ..... H04L 63/08; H04L 63/10; H04L 65/4084; H04L 2463/103
USPC .................................................. 709/228-229
See application file for complete search history.

(56) References Cited

U.S. PATENT DOCUMENTS

| 8,965,932 | B2 * | 2/2015 | Torres ........................... 707/795 |
| 2008/0168567 | A1 * | 7/2008 | Hahn et al. ...................... 726/28 |
| 2013/0024226 | A1 * | 1/2013 | Bourke ........................ 705/7.12 |

FOREIGN PATENT DOCUMENTS

| CN | 1595387 | 3/2005 |
| CN | 101453472 | 6/2009 |
| CN | 101494761 | 7/2009 |

OTHER PUBLICATIONS

International Search Report for PCT/CN2012/086150, mailed Feb. 27, 2013.

*Primary Examiner* — Minh-Chau Nguyen
(74) *Attorney, Agent, or Firm* — Nixon & Vanderhye P.C.

(57) ABSTRACT

Disclosed are a resource sharing method and device, and a storage medium. The technical solution in the embodiments of the present invention is applied to use a relationship chain to perform authentication control. When a resource download link is generated, corresponding relationship chain information is added into the link, and the resource download link is recorded and sent by a sharing server. When a user needs to perform downloading according to the received resource download link, authentication is performed on the user according to the relationship chain information. Only users who have the friendly relationship corresponding to the relationship chain are permitted to download specific contents, thereby introducing a controlled resource sharing mechanism in the existing download platform system, controlling contents to be legally and orderly spread, and at the same time enabling the resource spreading process to be traced.

20 Claims, 4 Drawing Sheets

RESOURCE SHARING METHOD AND DEVICE, AND STORAGE MEDIUM

This application is the U.S. national phase of International Application No. PCT/CN2012/086150, filed Dec. 7, 2012, which designated the U.S. and claims priority to CN Application No. 201210055783.4, filed Mar. 5, 2012, the entire contents of each of which are hereby incorporated by reference.

FIELD OF THE INVENTION

The present invention relates to the field of communication technologies, in particular to a resource sharing method and device, and a storage medium.

BACKGROUND OF THE INVENTION

The Peer-to-Peer (P2P) technology is a new network technology depending on the computing capabilities and bandwidths of network participants rather than a few servers, and has been widely applied in file sharing and downloading. For the P2P technology, the download speed at one end is closely related to the upload speed at the other end. However, the upload speed in the widely used Asymmetric Digital Subscriber Line (ADSL) networking technology is not fast, but is up to only dozens of KBs per second, further, some users limit the upload speed manually, resulting in the lack of upload bandwidth resources in the P2P technology, and accordingly, users may generally suffer from the relatively slow speed in the P2P technology.

The Peer to Server (P2S) technology is a user-to-server transmission technology, by which the user downloads a file directly from a large download website, where the file is stored in a website server, thereby ensuring a good speed of file downloading, but there are some defects that the resources are dispersive and not easy to search.

The Peer to Server & Peer (P2SP) technology, unlike the conventional technology where the file downloading merely depends on the server, may be used for transmitting contents among various terminals machine in the network. Besides the P2P technology, the P2SP technology also includes a server, which is represented by "S". Through the P2SP technology, the originally isolated server and its mirror resources as well as the P2P resources are effectively integrated together. Also, the download stability and speed of the P2SP technology are significantly improved as compared with those of the conventional P2P or P2S technology. The P2SP technology is a user-to-server & user mechanism, which is different from any of the P2P technology and the P2S technology in that not only the P2P technology is supported but also server resources are integrated together with P2P resources by searching a database; and when a user is downloading a file, other resources are automatically searched so that a proper resource is selected for acceleration, thus, the download stability and speed of the P2SP technology are significantly improved as compared with those of the P2P technology.

During the downloading, if a user finds and desires to share or send a good download source and address to others, the following manners may be used:

(1) online transmission through an instant messaging software;

(2) asynchronous transmission through an email;

(3) transmission of various download resources and links through various social platforms for sharing; and (4) local publishing of resources, that is, a local file is uploaded to a transit server and a temporary link is generated and transmitted to a friend, so that the friend may download the file as desired.

For example, in the case of sharing on a microblog platform, a file can be directly shared via a microblog so that the file may be downloaded by the fans in time, thus the file may be shared more quickly; or, good resources can also be published via the microblog, so that the number of fans may be increased with the increase of downloading and forwarding times. As a fast growing content platform, the microblog can be used to quickly broadcast and spread resources, especially in a geometrical progression; and at present, each of the mainstream download tools and platforms provides an entry for sharing on the microblog, which will be increasingly popular with the advancement of the microblog open platform.

Figure 1:
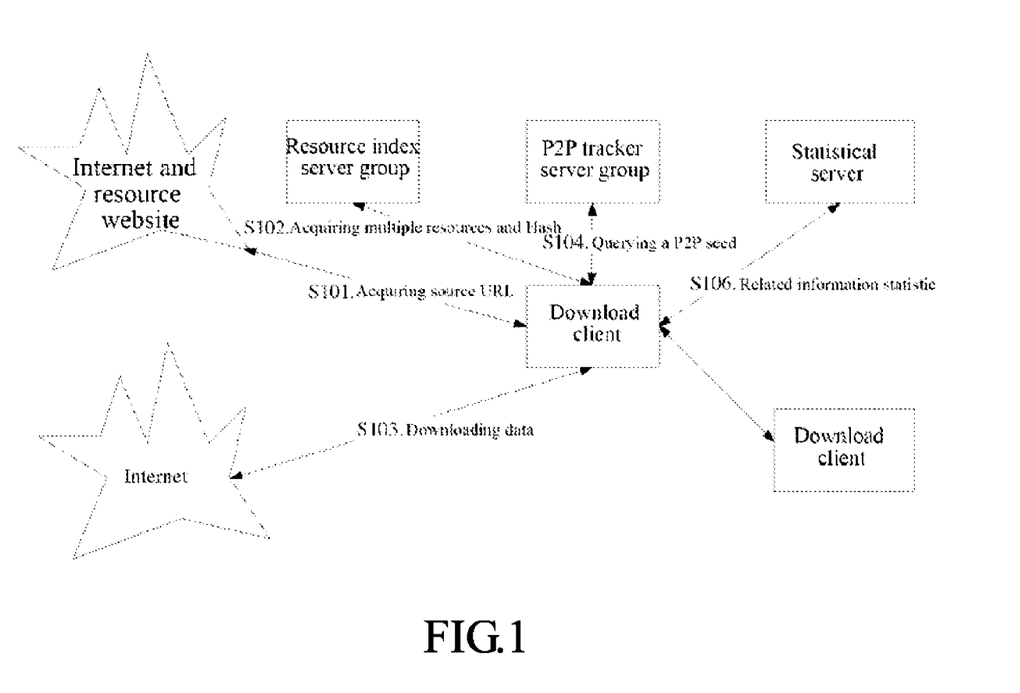
FIG. 1 is a flowchart showing the specific publishing of the P2SP download in the prior art.

In the P2SP technology, a file may be downloaded from data sources including an original link, a P2P network and an auxiliary source mirrored by a third party; and then, the file is obtained by assembling data together in series according to the unique identifier (such as MD5 or SHA) of the complete file. At present, FIG. 1 shows the flowchart of the specific publishing of P2SP download, specifically including the following Steps S101-S106:

At Step S101, a download client acquires a Uniform Resource Locator (URL) link from the Internet or a resource website when needing to download a file.

At Step S102, with the use of the URL link as an entry, the download client queries multiple resources and file Hash values from a resource index server and then downloads data from the queried URL link.

At Step S103, after completing the download, the download client registers file information to a tracker server.

At Step S104, other download clients query the peers having completed the download and the Peers in performing the download from the tracker server.

At Step S105, the other download clients start multi-resource P2P download and exchange data with the peers.

At Step S106, the related statistical information is reported to a statistical server after the download is completed.

Because of copyrights and laws, a lot of contents involving copyrights have been removed and taken offline from many download websites, and the address of an original file entry for the download by the users generally comes from the spreading among the friends of various Social Networking Services (SNS) sharing platforms, microblog platforms and instant messaging tools.

Such spreading among friends is characterized by a fast spreading speed, a wide spreading scope and flexible examination rules for spread contents.

The applicant found at least the following problems in the prior art during the implementation of the embodiments of the present invention:

1: The contents spread between friends and the whole spreading process thereof are not controlled by the download platform, and the risk of spreading illegal information exists due to the lack of an audit function.

2: The contents spread between friends and the download link spreading process are not traceable, for example, the contents in a network disk can be shared with microblog friends by an external microblog link, and the generated external microblog link can be directly published to a microblog without nay restraint, likely resulting in illegal content spreading.

3: The contents are spread very fast between the notified friends and the receiving group is uncertain, so that problems such as infringement of the spread contents and spreading of illegal contents may be caused; and once the contents are spread widely, such spreading cannot be controlled easily.

SUMMARY OF THE INVENTION

The embodiments of the present invention provide a resource sharing method, a resource sharing apparatus and a storage medium, solving the problems that resource sharing cannot be controlled and a resource sharing source cannot be traced in the prior art.

In order to achieve the objective above, in one aspect, an embodiment of the present invention provides a resource sharing method, specifically including:

receiving a resource sharing indication message from a user;

acquiring relationship chain information of the user from a sharing server;

generating a resource download link according to information of a shared resource corresponding to the resource sharing indication message and the acquired relationship chain information of the user; and transmitting the resource download link to another client via the sharing server to enable another user matching with the relationship chain information of the user to download the shared resource corresponding to the resource sharing indication message under a corresponding sharing rule.

In another aspect, an embodiment of the invention further provides a client, specifically including:

a receiving module, configured to receive a resource sharing indication message from a user;

an acquisition module, configured to acquire relationship chain information of the user from a sharing server;

a generation module, configured to generate a resource download link according to information of a shared resource corresponding to the resource sharing indication message and the acquired relationship chain information of the user; and a transmission module, configured to transmit the resource download link to another client via the sharing server to enable the another user matching the relationship chain information of the user to download the shared resource corresponding to the resource sharing indication message under a corresponding sharing rule.

In another aspect, an embodiment of the invention further provides a sharing server, at least including:

a receiving module, configured to receive a relationship chain request message from a client, wherein the relationship chain request message corresponds to a user of the client;

an acquisition module, configured to acquire the relationship chain information of the user from a corresponding relationship chain server; and a sending module, configured to return the relationship chain information of the user acquired by the acquisition module to the client.

In another aspect, an embodiment of the invention further provides a relationship chain server, at least including:

a storage module, configured to store relationship chain information corresponding to each user;

a receiving module, configured to receive a relationship chain request message from a sharing server; and a sending module, configured to send the relationship chain information corresponding to a responsive user stored in the storage module to the sharing server according to the relationship chain request message received by the receiving module.

In another aspect, an embodiment of the invention further provides a storage medium including computer executable instructions, wherein the computer executable instructions are configured to perform a resource sharing method including steps of:

receiving a resource sharing indication message from a user;

acquiring relationship chain information of the user from a sharing server;

generating a resource download link according to information of the shared resource corresponding to the resource sharing indication message and the acquired relationship chain information of the user; and transmitting the resource download link to another client via the sharing server to enable another user matching the relationship chain information of the user to download the shared resource corresponding to the resource sharing indication message under a corresponding sharing rule.

Compared with the prior art, the embodiments of the present invention are advantageous in that:

through the technical solutions of the embodiments of the present invention, a relationship chain is utilized for authentication and control; particularly, when a resource download link is generated, corresponding relationship chain information is added to the resource download link, which is then recorded and sent by the sharing server; and when a user needs to download resources according to the received resource download link, the user is authenticated according to the relationship chain information in the link such that only the users having the friend relationship corresponding to the relationship chain are allowed to download specific contents. Therefore, a controlled resource sharing mechanism is introduced in the existing download platform system, for the legally and orderly spreading of contents under control; and meanwhile, the resource spreading process can be traced.

BRIEF DESCRIPTION OF THE DRAWINGS

To explain the technical solutions in the embodiments of the present invention more clearly, the drawings used for the description of the embodiments are briefly described below. Obviously, the drawings described below illustrate only some embodiments of the present invention, and those skilled in the art may further obtain other drawings in light of these shown drawings without creative effort.

PREFERRED EMBODIMENTS OF THE INVENTION

The technical scheme in the embodiments of the present invention will be described clearly and completely below by combining with the drawings in the embodiments of the present invention. Obviously, the embodiments described herein form a part instead of all of the embodiments of the present invention. All other embodiments obtained by those skilled in the art in light of the embodiments herein without any creative effort fall within the protection scope of the invention.

As described in the background of the invention, in the conventional technical solution, sharing and downloading of resources are implemented by directly forwarding and connecting the link corresponding to the resources and there is no corresponding limiting and access recording mechanism, thus, there is a risk that illegal information is spread arbitrarily, and it is very difficult to trace the information spreading path and source due to the absence of corresponding precise record.

To overcome these defects, an embodiment of the invention provides a resource sharing method, where, the friend relationship between a resource sharer and a resource recipient is fully utilized for corresponding authentication control; particularly, when a resource download link is generated, the original information of the resources is added to the limit information of the corresponding relationship chain information to generate a new resource download link, which is recorded and sent by a sharing server; and when a user needs to download the resource according to the received resource download link, it is necessary to authenticate the user according to the relationship chain information in the link, to ensure that the specific contents can be downloaded by only users having the friend relationship corresponding to the relationship chain information.

Figure 2:
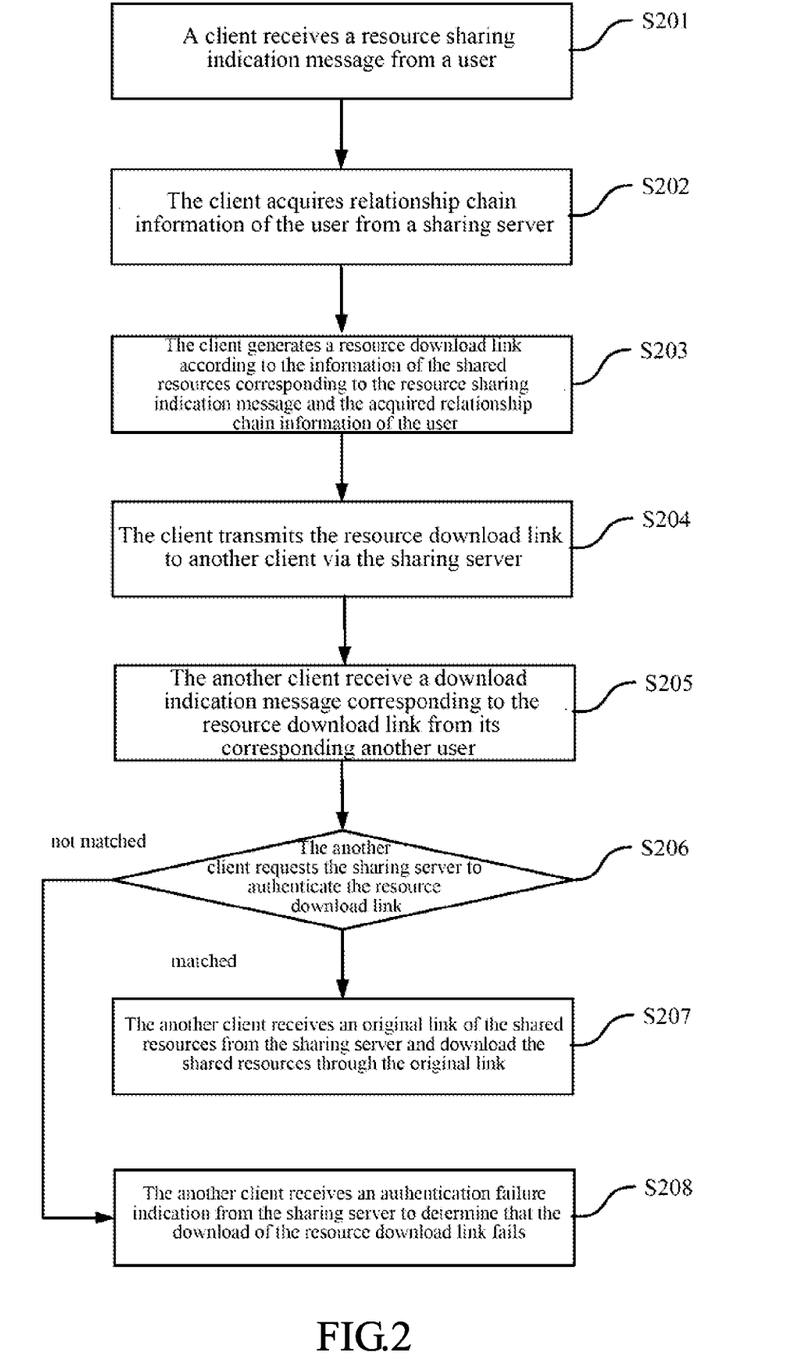
FIG. 2 is a schematic diagram showing the flow of a resource sharing method provided by an embodiment of the invention.

As shown in FIG. 2, which is a schematic diagram showing the flow of a resource sharing method provided by an embodiment of the invention, and the resource sharing method may be applied to a system including multiple detecting and killing engines. It should be noted that an example where a client receives a corresponding resource sharing indication message and performs the subsequent operations is specifically taken for illustration in the embodiment for the sake of description, without any improper limitation on the protection scope of the invention.

The method specifically includes the following Steps S201-S204.

Step S201: a client receives a resource sharing indication message from a user.

The resource sharing indication message mentioned here may be an operation indication either directly sent by the user or indirectly sent by the user by triggering a new operation flow, for example in some resource websites, a sharing button is explicitly added beside the published resource link, and the user can click the button to trigger the corresponding sharing operation.

Step S202: the client acquires the relationship chain information of the user from a sharing server.

Specifically, the specific operation process of the flow described at Step S202 includes that:

firstly, the client sends a relationship chain request message corresponding to the user to the sharing server;

and then, the sharing server acquires the relationship chain information of the user from a corresponding relationship chain server; and after the sharing server has acquired the corresponding relationship chain information, the client receives the relationship chain information of the user returned from the sharing server.

Through the flow above, the sharing server pulls the relationship chain information corresponding to the current user of the client from the corresponding relationship chain server.

In the actual application, the relationship chain information of the user can be specifically one or more of the following information:

(1) one-to-one relationship chain information with the user acting as the starting point and another user acting as the ending point;

(2) one-to-many relationship chain information with the user acting as the starting point and other multiple users acting as the ending points, respectively; and (3) relationship chain information with the user acting as the starting point and a relationship platform acting as the ending point, where the relationship platform corresponds to the user and includes many other users.

Specifically, such relationship platform can include a social networking platform, a messaging group formed by an instant messaging software, and so on.

It should be noted that the various types of information described above may be selected depending on the actual requirement and the protection scope of the invention will not be improperly limited no matter which one of or any combination of the above information is specifically selected. In another aspect, the relationship chain is used for identifying the friend relationship between the current user and other users, i.e., indicating that users corresponding to the two ends of the relationship chain can be related or traced by a certain relationship (such as friends, fans, and so on), therefore, besides the various types of relationships above, other types of information which can show the relationship between the users can also be applied as the relationship chain in the technical solutions provided by the embodiments of the present invention.

Step S203: the client generates a resource download link according to the information of shared resources corresponding to the resource sharing indication message and the acquired relationship chain information of the user.

In the specific application scenario, the processing flow at Step S203 can be specifically as follows: the client encrypts at least the unique Hash tag corresponding to the shared resources, sharing time information, information of the user, and information of the target user with whom the user shares the resources according to a preset algorithm and key to generate the resource download link.

Furthermore, in other actual application processes, in order to filter and limit the shared resources more precisely, the information to be encrypted by the client according to the preset algorithm and key may include further limit information such as sharing type information and/or sharing rule information.

The sharing type information can identity the specific type of the resources to be shared, so as to specify the type of information to be shared (such as video, document and application program). In an aspect, the corresponding user to whom the resources are shared can confirm the type of the acquired resources; and in another aspect, the corresponding network device (such as the sharing server) can also record the type of the shared resources, for the sake of recording and querying the resource sharing operation; furthermore, if it is necessary to limit the spreading of a certain type of resources in a network (for example, the sharing of an ".exe" file can be forbidden in order to prevent the spreading of viruses), the above sharing type information can be used to directly confirm the specific type of the shared resources; and if the shared resources are limited in sharing, the current sharing operation can be stopped to maintain the security of the network, so that the network is monitored conveniently.

The sharing rule information defines some limiting conditions on the party acquiring the resources in the resource sharing process, for example:

(1) the time of acquiring the resources can be limited, specifically, the resources can be acquired normally within a certain time period after the resources are shared, but cannot be acquired by the sharing target users or else any more when the time duration expires;

(2) the times for acquiring the resources can be limited, specifically, the download times of the resources is limited after the sharing of the resources starts, and if the current cumulative download times has reached the times threshold, the resources cannot be acquired any more no matter the user initiating the download operation is the sharing target users of the resources or not; and (3) the location of acquiring the resources can be limited, for example, an IP address range for download initiators is designated, and the resources can be downloaded only by a user having an address within the IP address range, and if a user initiating the download has an address beyond the IP address range, the resources cannot be acquired by this user no matter the user is the sharing target user of the resources or not.

Of course, in the actual operation, the contents and types of the sharing rule can be further expanded as desired actually; in addition, one or more specific types of sharing rules that are particularly adopted can be determined as desired actually, and such variation does not improperly limit the protection scope of the invention.

Step S204: the client transmits the resource download link to other clients via the sharing server, to enable other users matching with the relationship chain information of the user of the client to download the shared resources corresponding to the resource sharing indication message under the corresponding sharing rule.

After the above processing is completed, the specific delivering of the resource download link needs to be completed by the sharing server. In this way, the sharing server can record the corresponding spreading information of the resource download link in order to trace and check the resource download source and path subsequently.

Specifically, the resource download link may be delivered by the sharing server in any of the following manners 1-4:

Manner 1: The client directly transmits the resource download link to the other users corresponding to the other clients via the sharing server.

Manner 2: The client transmits the resource download link to the other users corresponding to the other clients through an instant messaging software via the sharing server.

Manner 3: The client transmits the resource download link to the other users corresponding to the other clients through an email via the sharing server.

Manner 4: The client transmits the resource download link to the other users corresponding to the other clients through a relationship platform via the sharing server.

No matter which of the above manners is adopted, the sharing server can record the corresponding forwarding information of the resource download link to confirm the sharing path information of the resources; besides the above manners, more transmission manners, such as Multimedia Messaging Service (MMS) and the point-to-point multimedia information transmission between different terminals, may emerge with the technology development, but the specific variation of the transmission manners will not affect the protection scope of the invention.

By the process above, the sharing of the resource download link is completed at a resource sharing end. For a resource receiving end, the corresponding processing process is also be adjusted correspondingly because of the relationship chain information carried in the resource download link and the like, and the user cannot download the corresponding resources until passing authentication, which is specifically described as follows:

Step S205: after the client transmits the resource download link to the other clients via the sharing server, the other clients receive the download indication message corresponding to the resource download link from the other users corresponding to said other clients; and Step S206: the other clients request the sharing server to authenticate the resource download link.

In the actual application, the specific authentication process includes the following procedures:

the other clients decrypt the resource download link to acquire the relationship chain information of the user and the information of the shared resources;

the other clients send a resource download link authenticating request, the relationship chain information of the user and the information of the shared resources to the sharing server;

the sharing server requests the corresponding relationship chain server to verify whether the other users match with the relationship chain information of the user;

if the other users match with the relationship chain information of the user, the sharing server sends an original link corresponding to the shared resources to the other clients and Step S207 is performed; and if the other users do not match with the relationship chain information of the user, the sharing server sends an authentication failure indication to the other clients and Step S208 is performed.

It should be noted that the operation of verifying whether the other users match with the relationship chain information of the user can include the following processing of:

when the information of the shared resources corresponds to information of one specific user (such as user identifier information, network address information corresponding to the user, etc.), verifying whether the other users correspond to the information of the shared resources; and when the information of the shared resources corresponds to information of a user group (such as group information, social networking platform information), verifying whether the other users belong to a user group corresponding to the information of the shared resources; for example, if the information of the shared resources is a microblog account, verifying whether the other users are fans of the microblog account, and if the information of the shared resources is a user group number, verifying whether the other users are members of the user group.

Step S207: the other clients receive the original link of the shared resources from the sharing server and download the shared resources through the original link.

Step S208: the other clients receive the authentication failure indication returned from the sharing server and determine that the download of the resource download link fails.

It should be further noted that, if the corresponding resource download link further carries the sharing type information and/or the sharing rule information as described in Step S203, it is necessary for the sharing server to further judge whether the resources requested to be downloaded conform to the type limit of legally downloadable resources and/or judge whether the other users conform to a corresponding sharing rule, when the verification result of the sharing server is positive in Step S206.

if the resources requested to be downloaded conform to the type limit of legally downloadable resources and/or judge whether the other users conform to a corresponding sharing rule, the sharing server sends the original link corresponding to the shared resources to the other clients and Step S207 is performed; otherwise, the sharing server sends an authentication failure indication to the other clients and Step S208 is performed.

Compared with the prior art, the embodiments of the present invention are advantageous in that:

through the technical solutions of the embodiments of the present invention, a relationship chain is utilized for authentication and control; particularly, when a resource download link is generated, corresponding relationship chain information is added to the resource download link, which is then recorded and sent by the sharing server; and when a user needs to download resources according to the received resource download link, the user is authenticated according to the relationship chain information in the link such that only the users having the friend relationship corresponding to the relationship chain are allowed to download specific contents. Therefore, a controlled resource sharing mechanism is introduced in the existing download platform system, for the legally and orderly spreading of contents under control; and meanwhile, the resource spreading process can be traced.

The technical solution provided by the embodiments of the present invention is described below by combining with a specific application scenario.

According to the concept of the technical solution provided by the embodiments of the present invention, when the client shares a download link, a resource download link is regenerated, and verification for the relationship chain is introduced to the generated resource download link.

In a specific processing scenario, the corresponding processing rule is as follows: FromID (i.e. source information, namely, the information of the resource sharing user), ToID (i.e. target information, namely, the information of the current resource sharing target, which can be specifically a user or a user group), sharing time (i.e., the current resource sharing time information), and the unique Hash tag of shared file contents (i.e., the identifier information of the shared resources) are combined to generate a new resource download link.

The specific combination process is as follows.

Firstly, fields shown in Table 1 below are integrated to form a buffer area, and the contents in the former four fields (i.e. SHA1, Timestamp, FromID and a partial field of ToID) are encrypted by an encryption algorithm and a predetermined key to obtain a Key, to prevent falsification.

TABLE 1

Combination of information for generating resource download link

| SHA1 (20) | TimeStamp (4) | FromID (4) | ToID | Key | Type |
| --- | --- | --- | --- | --- | --- | where, SHAI denotes a Secure Hash Algorithm (SHA), and is mainly applied to the Digital Signature Algorithm (DSA) defined in the Digital Signature Standard (DSS); here, the field of SHAI in Table 1 contains the contents of the unique Hash tag of the shared file contents and the label 20 in the brackets represents the length of this field.

TimeStamp denotes timestamp information, representing the current time for resource sharing, and the label 4 in the brackets represents the length of this field.

FromID and ToID denote respectively the information of the source user and the target user regarding the current resource sharing operation, which is obtained according to the relationship chain information, and the current path of the resource sharing operations can be obtained according to FromID and ToID.

Key denotes predetermined key information for preventing the resource download link from being falsified, and needs to be designated in advance for identifying the resource download link in each client.

Type denotes the sharing type information mentioned in Step S203, and will not be further described hereinafter.

It should be noted that the name, length and arrangement position of each field can be adjusted as actually desired, without improperly affecting the protection scope of the invention.

After the above processing is completed, the client constructs a new resource download link based on the information as processed above, and the new resource download link is transmitted to other clients via the sharing server or shared through an email, a microblog or in other specific ways.

For example, for an Http download task, the new resource download link obtained by the above processing is as follows:

http://fenxiang?ShaI=XXXXX&time=XXXXX& FromID=XXXXX&ToID=XXXXXX&Key=XXXXXX& Type=xxxxxx After obtaining such resource download link, any other client to download the resources need to be authenticated by the sharing server separately, in order to determine whether the resource download link is to be shared to or is from an legal user or conforms to the corresponding sharing rule; and after the authentication is passed, a real download link is acquired and actual data is fetched by p2sp transmission.

Furthermore, the following aspects in the whole process need to be explained.

(1) Contents can be downloaded and the existing contents can be browsed at the client through the existing platform.

(2) The relationship chain information (e.g. a friend relationship chain) acquired as above can be a one-to-one or one-to-many relationship chain, or a one-to-relationship platform relationship chain, such as a relationship chain on a microblog platform; and of course, legality examination is performed in combination with the corresponding relationship platform in this case.

(3) In sharing and spreading contents, information related to a new platform or a relationship chain is introduced in addition to the original unique identifier of the contents, to generate a unique identification link and check information (i.e., the new resource download link mentioned above).

(4) The way of sending the generated unique sharing identification link (i.e. the resource download link) to the other party is similar to a conventional one, such as sending via a QQ friend, a QQ group and an email, or sharing through a microblog, but the sharing server is involved.

(5) After receiving the resource download link, a friend clicks the link to trigger the authentication by the sharing server, so as to determine whether the current user is the sharing target user, whether the limit condition of the sharing is met (such as whether the allowed download times of the file is reached, whether the valid period expires, and whether the sharing source and target meet the expectation of a friend relationship), and if so, a normal download link is provided and a normal download service is carried out through p2sp transmission; otherwise, the download cannot be carried out normally.

(6) If the resources corresponding to the generated resource download link need to be shared and spread again, the user sharing the resources interacts with the sharing server so that a new sharing link (i.e. a new resource download link)

is generated for spreading the resources, thus the process of forwarding and spreading the link can be recorded by the sharing server.

Figure 3:
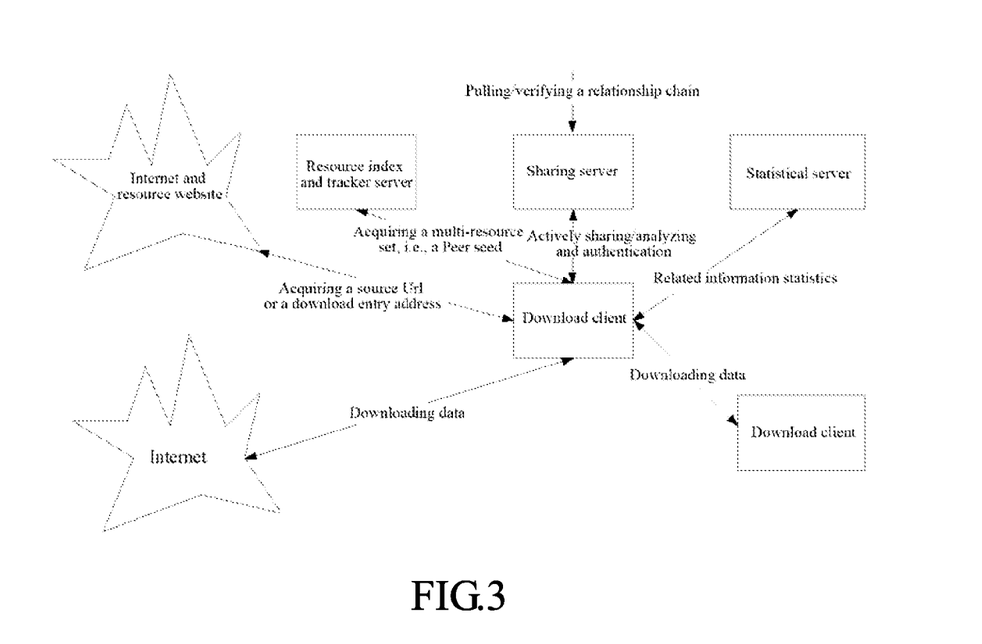
FIG. 3 is a schematic diagram showing a specific application scenario provided by an embodiment of the invention.

To further describe the technical solutions above, the main functions of each server module in a download link controlled-spreading system which is based on a friend relationship chain as provided in an embodiment of the invention as shown in FIG. 3 is described as follows.

1: Functions of Download Client (1) regularly reporting the online status and the locally owned resource information to a tracker server;

(2) querying a resource index server for a multi-resource Url set, Hash and file check information via a source Url, and downloading data from a Url set source;

(3) querying the tracker server for a Peer at the same time;

(4) after completing a download task, reporting the download time, download speed, download result, file size, original download link and filename of the downloaded file with respect to the download task to a statistical server;

(5) after a complete data fragment is downloaded in the download process, checking the data fragment, and if finding the data fragment is incorrect, reporting the incorrectness to the statistical server;

(6) pulling a friend relationship chain from the sharing server, generating a sharing link for the completely downloaded resource, and sending the link to a target receiver such as a QQ friend and an email system via the sharing server; and (7) if the link obtained by the user through the client is a sharing link, authenticating and controlling the friend relationship in a friend relationship chain server via the sharing server.

2: Functions of Multi-Resource Query Server (1) receiving a query for a file Hash that is made by the client using a Url as an index entry;

(2) receiving a query for the downloaded multi-Url resource set that is made by the client using a Url as an index entry; and (3) providing check information about the file fragment for a download client to check the validity of the downloaded data.

3: Functions of Tracker Server (1) registering each client requesting to joint the network, and feeding back an IP address list of nodes containing the resource;

(2) receiving the online status report of the client, generating a node list for each resource and feeding back when a node requests to download the task; and (3) receiving a Peer online control policy synchronized with a bandwidth scheduling server and transmitting the same to a Peer client when the Peer logs on.

4: Functions of Sharing Server (1) accepting a query from the client and pulling a friend relationship chain server to the client;

(2) communicating with the sharing server to generate a shared link when the client is to share based on the friend relationship chain;

(3) sending the shared link through the friend relationship to, for example, a friend mailbox and a group including the friend;

(4) accessing the sharing server to authenticate the relationship chain, check the validity, check the time, control the download times and the like when the target user receives the shared link but the download is not began; and (5) if the downloading user is a friend of the sharer, transmitting the original downloadable link to the client, otherwise, transmitting an authentication failure indication so that the downloading user cannot download the resources.

5: Functions of Relationship Chain Server (1) querying for a friend relationship chain, such as querying for friends of a user and querying for a group containing the user as a friend; and (2) providing an interface for verifying the friend relationship to the sharing server to verify whether the two users are friends or whether a friend belongs to a group, such as a QQ group and an MSN group.

6: Functions of Statistical Server (1) receiving reports of the download completion and the Url download speed, download time, communication status, download result, file size and so on in the download process from the client, and logging these information into an agenda for the subsequent statistical analysis; and (2) synchronizing the download speed and download time of the newly reported or partial existing Url sources with a Url rating policy server.

Compared with the prior art, the embodiments of the present invention are advantageous in that:

through the technical solutions of the embodiments of the present invention, a relationship chain is utilized for authentication and control; particularly, when a resource download link is generated, corresponding relationship chain information is added to the resource download link, which is then recorded and sent by the sharing server; and when a user needs to download resources according to the received resource download link, the user is authenticated according to the relationship chain information in the link such that only the users having the friend relationship corresponding to the relationship chain are allowed to download specific contents. Therefore, a controlled resource sharing mechanism is introduced in the existing download platform system, for the legally and orderly spreading of contents under control; and meanwhile, the resource spreading process can be traced.

Figure 4:
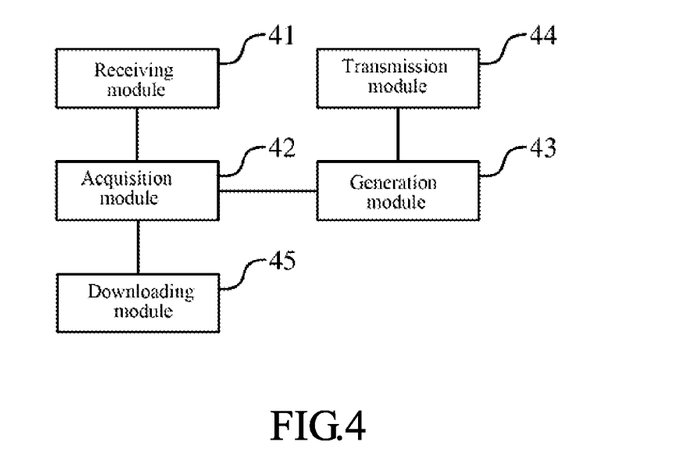
FIG. 4 is a schematic diagram showing the structure of a client provided by an embodiment of the invention.

To implement the technical solutions of the embodiments of the present invention, an embodiment of the invention further provides a client, the specific structure of which is schematically shown in FIG. 4, and the client includes:

a receiving module 41, configured to receive a resource sharing indication message from a user;

an acquisition module 42, configured to acquire relationship chain information of the user from a sharing server;

a generation module 43, configured to generate a resource download link according to the information of shared resources corresponding to the resource sharing indication message and the acquired relationship chain information of the user; and a transmission module 44, configured to transmit the resource download link to other clients via the sharing server, to enable other users matching with the relationship chain information of the user to download the shared resources corresponding to the resource sharing indication message under a corresponding sharing rule.

In the specific processing scenario, the generation module 43 is specifically configured to:

encrypt at least the unique Hash tag corresponding to the shared resources, sharing time information, information of the user and information of the target user with whom the user shares the resources, according to a preset algorithm and key, to generate the resource download lin.

The information to be encrypted according to the preset algorithm and key may further include sharing type information and/or sharing rule information.

It should be noted that the client further includes a downloading module 45.

The receiving module 41 is further configured to receive the resource download link from another client as well as the download indication message that corresponds to the resource download link and sent by a user corresponding to the receiving module.

The acquisition module 42 is further configured to request the sharing server to authenticate the resource download link received by the receiving module 41, receive the original link of the shared resources from the sharing server if the user matches with the relationship chain information contained in the resource download link, and receive the authentication failure indication from the sharing server if the user does not match with the relationship chain information contained in the resource download link.

The downloading module 45 is configured to download the shared resources through the original link after the acquisition module 42 receives the original link, or determine that the download of the resource download link fails after the acquisition module 42 receives the authentication failure indication from the sharing server.

It should be further noted that:

the generation module 43 is further configured to, after the receiving module 41 receives the resource download link from another client, decrypt the resource download link to obtain the relationship chain information and the information of the shared resources; and the acquisition module 42 is specifically configured to send a resource download link authenticating request, the relationship chain information of the user and the information of the shared resources to the sharing server.

Figure 5:
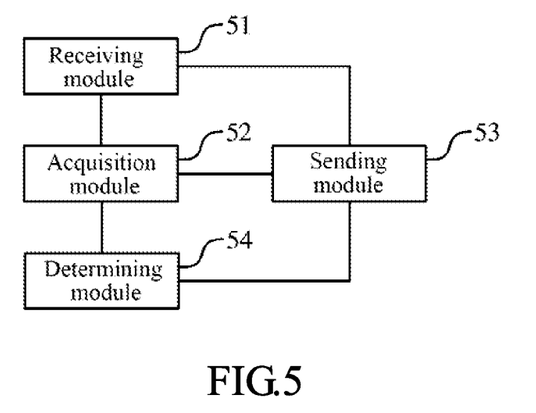
FIG. 5 is a schematic diagram showing the structure of a sharing server provided by an embodiment of the invention.

In another aspect, an embodiment of the invention further provides a sharing server with the structure schematically shown in FIG. 5, and the sharing server at least includes:

a receiving module 51, configured to receive a relationship chain request message from a client, where the relationship chain request message corresponds to a user of the client;

an acquisition module 52, configured to acquire the relationship chain information of the user from a corresponding relationship chain server; and a sending module 53, configured to return the relationship chain information of the user acquired by the acquisition module 52 to the client.

In the specific processing scenario, the receiving module 51 is further configured to receive a resource download link authenticating request from the client, and the relationship chain information of the user and the information of the shared resources corresponding to the resource download link decrypted by the client;

the acquisition module 52 is further configured to request the corresponding relationship chain server to verify whether the user corresponding to the client matches with the relationship chain information of the user corresponding to the resource download link; and the sending module 53 is further configured to send an original link corresponding to the shared resources to the client when the verification result is positive or send a verification failure indication to the other clients when the verification result is negative.

Furthermore, the sharing server further includes a determining module 54, which is configured to:

determine whether the user corresponding to the client conforms to the corresponding sharing rule when the verification result is positive; and indicate the sending module 53 to send the original link corresponding to the shared resources to the client if the determining result is positive, and indicate the sending module 53 to send the authentication failure indication to the client if the determining result is negative.

In another scenario, the receiving module 51 is further configured to receive the resource download link to be shared from the client; and the sending module 53 is further configured to directly send the resource download link to the other users corresponding to the other clients, or send the resource download link to the other users corresponding to the other clients through an instant messaging software, or send the resource download link to the other users corresponding to the other clients through an email, or send the resource download link to the other users corresponding to the other clients through a relationship platform.

Figure 6:
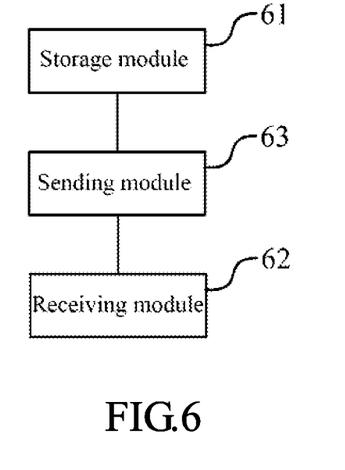
FIG. 6 is a schematic diagram showing the structure of a relationship chain server provided by an embodiment of the invention.

In another aspect, an embodiment of the invention further provides a relationship chain server with the structure schematically shown in FIG. 6, and the server at least includes:

a storage module 61, configured to store relationship chain information corresponding to each user;

a receiving module 62, configured to receive a relationship chain request message from a sharing server; and a sending module 63, configured to send the relationship chain information corresponding to a responsive user stored in the storage module 61 to the sharing server, according to the relationship chain request message received by the receiving module 62.

In the specific processing scenario, the receiving module 62 is further configured to receive a message of verifying whether the user corresponding to the client matches with the relationship chain information of the user corresponding to the resource download link from the sharing server; and the sending module 63 is further configured to send the corresponding verification result to the sharing server.

Compared with the prior art, the embodiments of the present invention are advantageous in that:

through the technical solutions of the embodiments of the present invention, a relationship chain is utilized for authentication and control; particularly, when a resource download link is generated, corresponding relationship chain information is added to the resource download link, which is then recorded and sent by the sharing server; and when a user needs to download resources according to the received resource download link, the user is authenticated according to the relationship chain information in the link such that only the users having the friend relationship corresponding to the relationship chain are allowed to download specific contents. Therefore, a controlled resource sharing mechanism is introduced in the existing download platform system, for the legally and orderly spreading of contents under control; and meanwhile, the resource spreading process can be traced.

Through the description of the embodiments above, those skilled in the art may clearly understand that the embodiments of the present invention may be implemented by hardware or software on a necessary general hardware platform. Based on such understanding, the technical solutions of the embodiments of the present invention may be embodied in the form of a software product, which may be stored in a non-volatile storage medium (such as a Compact Disc-Read Only Memory (CD-ROM), a Universal Serial Bus (USB) disk and a mobile hard disk) and includes instructions to enable a computer device (such as a personal computer, a server and a network device) to perform the method described in each implementation scenario of the embodiments of the present invention.

Those skilled in the art may understand that the drawing is only a schematic diagram of a preferred implementation scenario, and the modules or flow in the drawings may be not necessary to implement the embodiments of the present invention.

Those skilled in the art may understand that the modules in the apparatus in the implementation scenario may be distributed in the apparatus in the implementation scenario according to what described in the implementation scenario, or be adapted to one or more apparatuses different from that of the implementation scenario. The modules in the implementation scenario may be assembled into a module or further disassembled into multiple sub-modules.

The numerals of each embodiment of the present invention are only for a description purpose, but not used for representing the priority of implementation scenarios.

What disclosed above are only some specific implementation scenarios of the embodiments of the present invention, and do not limit the embodiments of the present invention, and any variations by those skilled in the art shall fall within the scope of the embodiments of the present invention.

The invention claimed is:

1. A resource sharing method, comprising:
receiving a resource sharing indication message from a user;
acquiring relationship chain information of the user from a sharing server;
generating a resource download link according to information of a shared resource corresponding to the resource sharing indication message and the acquired relationship chain information of the user; and
transmitting the resource download link to another client via the sharing server to enable another user matching with the relationship chain information of the user to download the shared resource corresponding to the resource sharing indication message under a corresponding sharing rule.

2. The method according to claim 1, wherein, after transmitting the resource download link to another client via the sharing server, further comprising:
receiving, by the another client, a download indication message corresponding to the resource download link from the another user corresponding to the another client;
requesting, by the another client, the sharing server to authenticate the resource download link;
if the another user matches the relationship chain information of the user contained in the resource download link, receiving, by the another client, an original link of the shared resource from the sharing server and downloading the shared resource through the original link; and
if the other users does not match the relationship chain information of the user contained in the resource download link, receiving, by the another client, an authentication failure indication from the sharing server to determine that the download of the resource download link fails.

3. The method according to claim 2, wherein, requesting the sharing server to authenticate the resource download link by the another client comprises:
decrypting the resource download link by the another client to acquire the relationship chain information of the user and the information of the shared resource;
sending, by the another client, a resource download link authenticating request, the relationship chain information of the user and the information of the shared resource to the sharing server;
requesting, by the sharing server, a corresponding relationship chain server to verify whether the another user matches the relationship chain information of the user;
if the another user matches the relationship chain information of the user, sending the original link corresponding to the shared resource to the another client by the sharing server; and
if the another user does not match the relationship chain information of the user, sending an authentication failure indication to the another client by the sharing server.

4. The method according to claim 3, wherein, after the sharing server requests the corresponding relationship chain server to verify whether the another user matches the relationship chain information of the user, the method further comprises:
if the another user matches the relationship chain information of the user, determining whether the another user conforms to a corresponding sharing rule by the sharing server;
and if the another user conforms to a corresponding sharing rule, sending the original link corresponding to the shared resource to the another client by the sharing server, and if the another user does not conform to a corresponding sharing rule, sending an authentication failure indication to the another client by the sharing server.

5. The method according to claim 4, wherein, the sharing rule comprises:
a type matching limit, and/or
a sharing time length limit, and/or
a limit on download times.

6. The method according to claim 1, wherein, generating the resource download link according to information of a shared resource corresponding to the resource sharing indication message and the acquired relationship chain information of the user comprises:
encrypting at least a unique Hash tag corresponding to the shared resource, sharing time information, information of the user and information of a target user with whom the user shares the resource, according to a preset algorithm and key to generate the resource download link.

7. The method according to claim 6, wherein, the information to be encrypted according to the preset algorithm and key further comprises:
sharing type information and/or sharing rule information.

8. The method according to claim 7, wherein, the sharing rule comprises:
a type matching limit, and/or
a sharing time length limit, and/or
a limit on download times.

9. The method according to claim 1, wherein, acquiring the relationship chain information of the user from the sharing server specifically comprises:
sending a relationship chain request message corresponding to the user to the sharing server;
acquiring, by the sharing server, the relationship chain information of the user from a corresponding relationship chain server; and
receiving the relationship chain information of the user from the sharing server.

10. The method according to claim 9, wherein, the relationship chain information of the user is specifically:
one-to-one relationship chain information, with the user acting as a starting point and another user acting as an ending point, and/or, one-to-many relationship chain information, with the user acting as a starting point and other multiple users acting as ending points, respectively, and/or,
relationship chain information with the user acting as a starting point and a relationship platform acting as an ending point, wherein the relationship platform corresponds to the user and comprises multiple other users.

11. The method according to claim 1, wherein, transmitting the resource download link to another client via the sharing server comprises:
directly transmitting the resource download link to another user corresponding to another client via the sharing server;
transmitting the resource download link to another user corresponding to another client through an instant messaging software via the sharing server;
transmitting the resource download link to another user corresponding to another client through an email via the sharing server; or,
transmitting the resource download link to another user corresponding to another client through a relationship platform via the sharing server.

12. A client, comprising one or more processors; a memory; and a plurality of program modules stored in the memory and configured to be executed by the one or more processors, wherein the plurality of program modules further comprising:
a receiving module, configured to receive a resource sharing indication message from a user;
an acquisition module, configured to acquire relationship chain information of the user from a sharing server;
a generation module, configured to generate a resource download link according to information of a shared resource corresponding to the resource sharing indication message and the acquired relationship chain information of the user; and
a transmission module, configured to transmit the resource download link to another client via the sharing server to enable the another user matching the relationship chain information of the user to download the shared resource corresponding to the resource sharing indication message under a corresponding sharing rule.

13. The client according to claim 12, further comprising a downloading module, wherein
the receiving module is further configured to receive a resource download link from the another client, and a download indication message corresponding to the resource download link from the another client from a user corresponding to the client;
the acquisition module is further configured to request the sharing server to authenticate the resource download link received by the receiving module, receive an original link of the shared resource from the sharing server if the user matches the relationship chain information contained in the resource download link, and receive an authentication failure indication from the sharing server if the user does not match the relationship chain information contained in the resource download link; and
the downloading module is configured to download the shared resource through the original link after the acquisition module receives the original link, or determine that the download of the resource download link fails after the acquisition module receives the authentication failure indication from the sharing server.

14. The client according to claim 13, wherein,
the generation module is further configured to, after the receiving module receives the resource download link from another client, decrypt the resource download link to acquire the relationship chain information and the information of the shared resource; and
the acquisition module is configured to send a resource download link authenticating request, the relationship chain information of the user and the information of the shared resource to the sharing server.

15. The client according to claim 12, wherein, the generation module is configured to:
encrypt at least a unique Hash tag corresponding to the shared resource, sharing time information, information of the user and information of a target user with whom the user shares the resource, according to a preset algorithm and key, to generate the resource download link, wherein
the information to be encrypted according to the preset algorithm and key further comprises sharing type information and/or sharing rule information.

16. A sharing server, comprising one or more processors; a memory; and a plurality of program modules stored in the memory and configured to be executed by the one or more processors, wherein the plurality of program modules at least comprising:
a receiving module, configured to receive a relationship chain request message from a client, wherein the relationship chain request message corresponds to a user of the client;
an acquisition module, configured to acquire the relationship chain information of the user from a corresponding relationship chain server; and
a sending module, configured to return the relationship chain information of the user acquired by the acquisition module to the client;
wherein, the receiving module is further configured to receive a resource download link authenticating request from the client, and the relationship chain information of the user and the information of the shared resource corresponding to the resource download link decrypted by the client;
the acquisition module is further configured to request a corresponding relationship chain server to verify whether the user corresponding to the client matches the relationship chain information of the user corresponding to the resource download link; and
the sending module is further configured to send an original link corresponding to the shared resource to the client when the verification result is positive or send a verification failure indication to the another client when the verification result is negative.

17. The sharing server according to claim 16, further comprising a determining module, which is configured to:
determine whether the user corresponding to the client conforms to a corresponding sharing rule when the verification result is positive;
if the user corresponding to the client conforms to a corresponding sharing rule, indicate the sending module to send the original link corresponding to the shared resource to the client; otherwise, indicate the sending module to send an authentication failure indication to the client.

18. The sharing server according to claim 16, wherein,
the receiving module is further configured to receive the resource download link to be shared from the client; and
the sending module is further configured to directly send the resource download link to another user corresponding to the another client, or send the resource download link to the another user corresponding to the another client through instant messaging software, or send the resource download link to the another user corresponding to the another client through an email, or send the resource download link to the another user corresponding to the another client through a relationship platform.

19. A relationship chain server, comprising one or more processors; a memory; and a plurality of program modules stored in the memory and configured to be executed by the one or more processors, wherein the plurality of program modules at least comprising:
- a storage module, configured to store relationship chain information corresponding to each user;
- a receiving module, configured to receive a relationship chain request message from a sharing server; and
- a sending module, configured to send the relationship chain information corresponding to a responsive user stored in the storage module to the sharing server according to the relationship chain request message received by the receiving module;
- wherein, the receiving module is further configured to receive a message of verifying whether the user corresponding to the client matches the relationship chain information of the user corresponding to the resource download link, from the sharing server; and
- the sending module is further configured to send a corresponding verification result to the sharing server.

20. One or more non-transitory storage media comprising computer executable instructions, wherein the computer executable instructions are configured for performing a resource sharing method comprising steps of:
- receiving a resource sharing indication message from a user;
- acquiring relationship chain information of the user from a sharing server;
- generating a resource download link according to information of the shared resource corresponding to the resource sharing indication message and the acquired relationship chain information of the user; and
- transmitting the resource download link to another client via the sharing server to enable another user matching the relationship chain information of the user to download the shared resource corresponding to the resource sharing indication message under a corresponding sharing rule.

* * * * *